Sept. 9, 1941.                A. C. DRESSLER                    2,255,351
                  AUTOMATIC CONTROL HEAD FOR BREATHER SYSTEMS
                      Filed Jan. 12, 1940           2 Sheets-Sheet 1
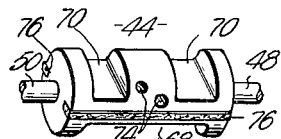
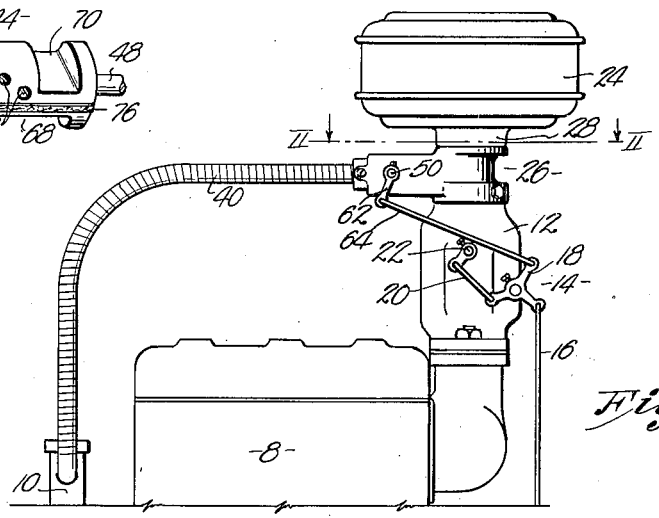
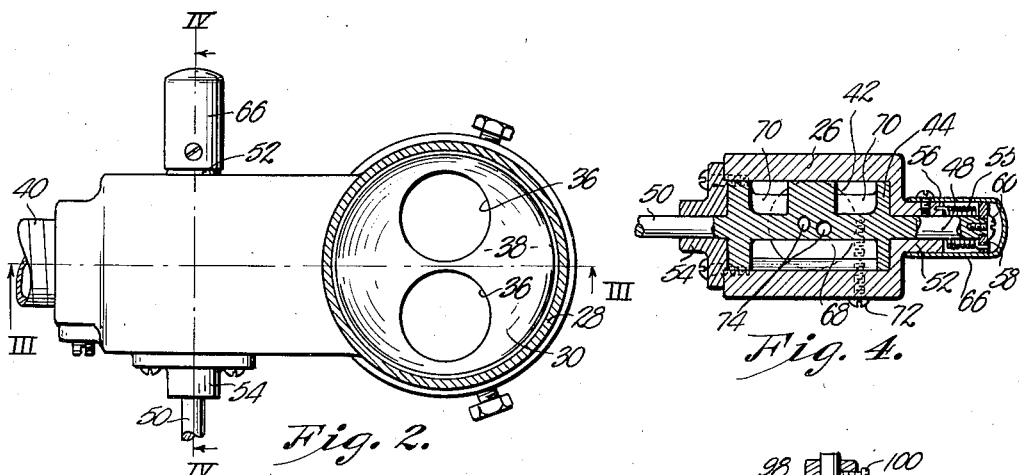
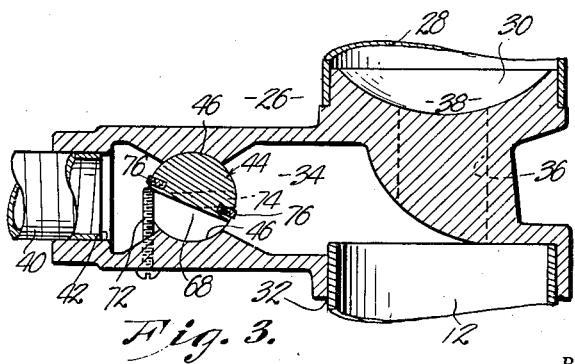
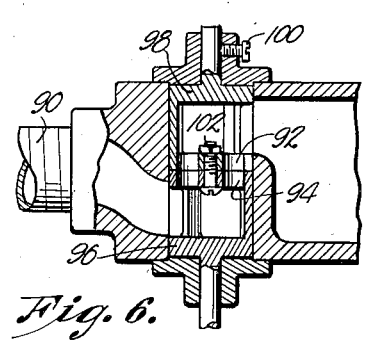
INVENTOR.
Adolph C. Dressler
BY
Howry Hamilton
ATTORNEYS Sept. 9, 1941.  A. C. DRESSLER  2,255,351
AUTOMATIC CONTROL HEAD FOR BREATHER SYSTEMS
Filed Jan. 12, 1940  2 Sheets-Sheet 2
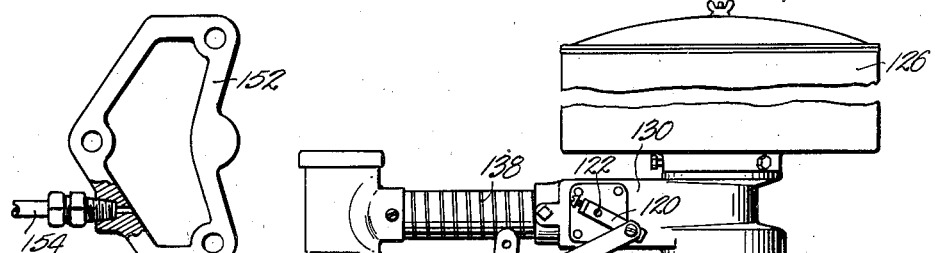
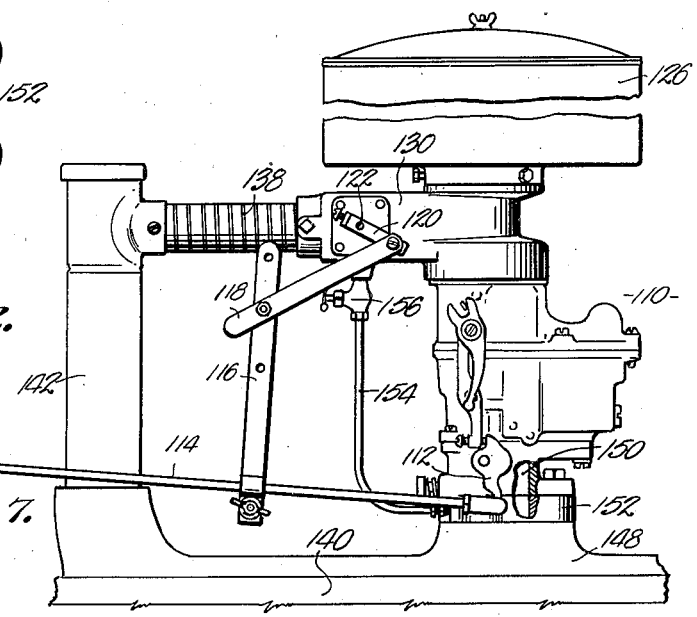
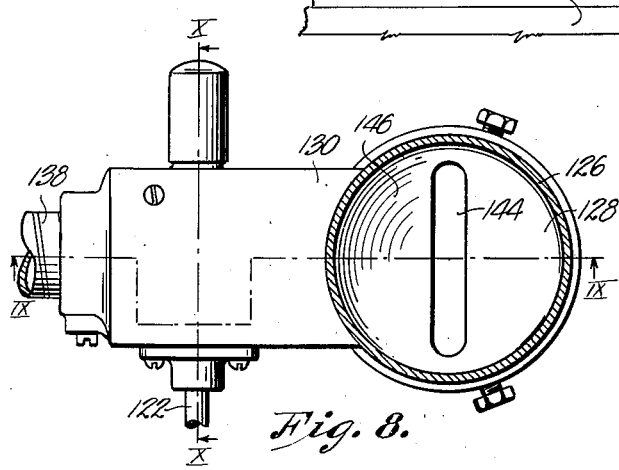
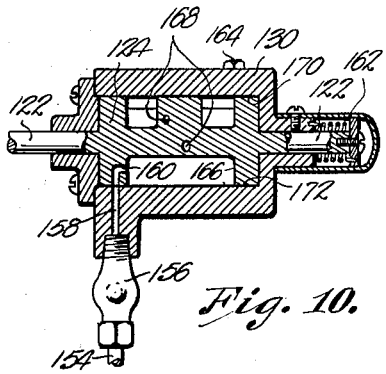
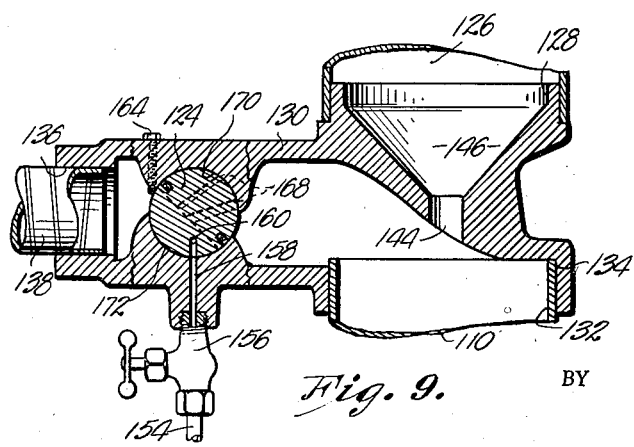
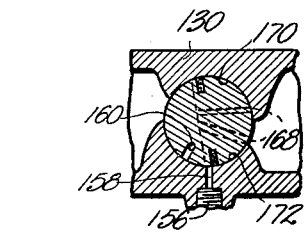
INVENTOR.
Adolph C. Dressler
BY
ATTORNEYS Patented Sept. 9, 1941

2,255,351

UNITED STATES PATENT OFFICE 2,255,351

AUTOMATIC CONTROL HEAD FOR BREATHER SYSTEMS

Adolph C. Dressler, Miami, Okla., assignor to Dieselair Corporation, Miami, Okla., a corporation of Delaware Application January 12, 1940, Serial No. 313,577

10 Claims. (Cl. 123—119)

This invention relates to attachments for internal combustion engines and particularly means for automatically withdrawing evolved vapors from the crankcase of the engine and depositing the same in the intake manifold of the engine either directly or through the carburetor.

One of the important aims of the instant invention is to provide an automatic control head for breather systems, in the nature of those designed to convey evolved vapors from the crankcase of an engine, to the intake manifold thereof, said head having a specially designed rotary valve, which effectively controls the passage of vapors into the head as the speed of the engine increases or decreases.

A yet further object of this invention is to provide a breather system of the aforementioned character wherein the control valve of the system head is provided with specially disposed arcuate valve seats and uniquely designed and arranged passageways that cooperate with said seats in such manner as to render the system efficient and susceptible of automatically changing the force for withdrawing evolved vapors as the engine speed is changed.

An even further object of this invention is to provide a control head for engine breather systems, which head has connection with that portion of the carburetor of the engine between the throttle of the carburetor and the intake manifold where a relatively high vacuum is normally maintained, to the end that vapors are withdrawn from the crankcase when the engine is idling.

This invention has for a further object the provision of a specially designed head for breather systems, which head has an unique air intake port for increasing the velocity of air passing to the carburetor so as to establish a vacuumatic action in the head without decreasing the volume of air which should normally pass to the carburetor to insure efficient operation.

Another object of the invention is to provide a self-cleaning vapor valve for breather system heads, which valve has elements for wiping the arcuate faces of the valve seats as the valve member is moved about its axis to open and close a number of transversely arranged passageways provided therethrough.

Other objects of the invention will appear during the course of the following specification, referring to the accompanying drawings, wherein:

Figure 1 is a fragmentary side elevational view of an internal combustion engine having a breather system equipped with an automatic control head made in accordance with the present invention.

Fig. 2 is an enlarged fragmentary sectional view taken through the assembly above the head on line II—II of Fig. 1.

Fig. 3 is a longitudinal sectional view taken on line III—III of Fig. 2.

Fig. 4 is a transverse cross sectional view through the head taken on line IV—IV of Fig. 2.

Fig. 5 is a perspective view of the valve member entirely removed from the head.

Fig. 6 is a fragmentary sectional view through a portion of a head for breather systems, illustrating a modified form of the invention.

Fig. 7 is a fragmentary side elevational view of an internal combustion engine having a breather system provided with a double connection to the carburetor.

Fig. 8 is a top plan view partly in section of a head for breather systems, illustrating a modified form of the invention.

Fig. 9 is a fragmentary sectional view through the head taken on line IX—IX of Fig. 8.

Fig. 10 is a cross sectional view taken on line X—X of Fig. 8.

Fig. 11 is a fragmentary sectional view through the rotary valve of the form of breather system head shown in Fig. 9; and Fig. 12 is a plan view partly in section of the section forming a part of the connection between the breather system head and the carburetor.

The internal combustion engine with which the breather system, embodying this invention, is adapted to be used, is provided with the conventional breather neck 10 that communicates with the chamber of the crankcase of the engine and through which evolved vapors usually escape. The engine 8 in most cases, has an intake opening for air, not here shown, which combines with neck 10 in establishing a ventilating system.

The carburetor 12 forming a part of engine 8, is controlled by a throttle generally designated by the numeral 14 and having a rod 16 extending to a manually controllable element and a rocker arm 18 mounted directly upon the case of the carburetor to control link 20 which is operably joined to shaft 22.

An air filter 24 in communication with carburetor 12, is secured directly to head 26 of the breather system so that its outlet neck 28 is in communication with air intake port 30 of head 26. The air outlet port 32 of head 26 is directly joined to carburetor 12. The portion of head 26 which forms intake and outlet ports 30 and 32 respectively, is specially formed so as to increase the velocity of the air passing from intake to outlet in order that a vacuumatic action may be created to draw vapors into chamber 34 of head 26. Air intake port 30 of head 26 is divided into two ways 36, both of which communicate with the lowermost portion of a dish-shaped wall 38 that extends downwardly and inwardly from the upper edge of head 26. This specially formed face and ways 38 and 36 respectively, handle the air so that the greatest amount of suction may be created in chamber 34 regardless of the speed of engine 8.

When head 26 is interposed between carburetor 12 and air filter 24, the portion that projects to one side of that part thereof forming intake and outlet ports 30 and 32 respectively, is joined to neck 10 by a flexible conduit 40 through which evolved vapors from the engine crankcase are drawn to head 26. Conduit 40 joins vapor inlet opening 42 of head 26 near a specially constructed control means, two forms of which are illustrated in the accompanying drawings.

In the preferred embodiment illustrated in Figs. 3, 4 and 5, the valve member 44 is cylindrical and extends transversely across chamber 34. Two arcuate valve seats 46 created on the inner opposed faces of head 26 operably engage portions of the outer periphery of member 44. Member 44 has longitudinally extending stub shafts 48 and 50 that are journalled in bearings 52 and 54 respectively.

Member 44 is yieldably maintained at one end of its path of travel by spring 56 that is coiled about shaft 48, as seen in Fig. 4. One end of this spring is anchored to a portion of head 26 as at 56, while the other end of said spring is anchored to plate 58, which is secured directly to the free end of stub shaft 48 by machine screw 60. The other shaft 50 carries rocker arm 62 joined to one end of rod 64, the other end of which is connected to member 18 of throttle 14. A cap 66 may be positioned to house spring 54 and the associated parts.

Valve member 44 is cut away intermediate its ends to present a relatively large notch 68 disposed on one side of the axis thereof. A pair of notches 70 on the other side of the axis cooperate with notch 68 in leaving unrestricted the chamber within head 26 when the engine 8 is in an idling condition. Spring 54 yieldably maintains member 44 in the position where vapors may pass through notches 68 and 70 and an adjustable stop 72 mounted in head 26 insures that member 44 will return to the position illustrated when throttle 14 is set to allow engine 8 to idle.

In addition to notches 68 and 70 that are formed in member 44, there are a plurality of passageways 74 formed transversely through member 44 at an angle to each other so that as the said member 44 is rotated about its axis, the passageways 74 will be successively restricted by arcuate seats 46. These passageways 74 are of different diameters and arranged so that the one of larger diameter will be first restricted and then the one of smaller diameter restricted, whereby the vacuumatic action is controlled to draw vapors through head 26 as the engine speeds vary without setting up a suction great enough to withdraw oil from the crankcase.

Member 44 is made so that it cleans the arcuate faces of seats 46. To accomplish this result, a plurality of laterally extending ribs 76 of fibrous material are created on member 44. The specific manner of placing these ribs in the operative condition is to groove member 44 longitudinally and thereafter set fibrous strips 76 into said grooves with a very small portion thereof projecting beyond the arcuate outer face of member 44.

After all of passageways 74 have been closed member 44 is completely restricting the passage of vapors from inlet opening 42 to outlet port 32. This condition prevails when the engine is under extreme full throttle and when an objectionable amount of vacuumatic action would be most likely to be set up to draw solids or oil from within the crankcase.

The control valve illustrated in Fig. 6, indicates the manner in which the physical form of the automatic head may be changed without departing from the broad concepts of the invention.

The valve which controls the passage of vapors through conduit 90 is in this instance, made of two cylindrical parts placed end-to-end, both of which are hollow and have the abutting ends provided with openings 94 and 92 that may fully register or be progressively closed as the movable section 96 is rotated about its axis. Section 98 is held stationary by set screw 100 and bolt 102 loosely supports the abutting ends of said sections so that one may rotate with respect to the other.

The breather system shown in Figs. 8 to 12 inclusive, embodies a slightly modified form of the invention insofar as the means for withdrawing vapors from the crankcase while the engine is idling, is concerned.

In these drawings, the numeral 110 indicates the carburetor generally, which is supplied with fuel feeding structure 112 that includes the throttle rod 114 to which links 116 and 118 are operably attached. These links are in connection with arm 120 secured to stub shaft 122, integral with valve member 124. The air cleaner 126 is joined to the air intake port 128 of chambered head 130 and the intake port 132 of carburetor 110 is joined to the air outlet port 134 of head 130. A vapor inlet opening 136 is at one end of head 130 and receives conduit 138 which is joined to the crankcase of the engine 140, either directly or through the medium of filler tube 142.

In the illustrated embodiment shown in Fig. 7, the breather system is associated with the V-type engine and therefore, a short conduit 138 may be used. Air to the carburetor 110 is drawn through air intake 128 which terminates in an elongated opening 144 at the bottom of a conical wall 146. As hereinabove explained, this shape wall will set up a maximum amount of suction without decreasing the volume of air needed for carburetion.

Carburetor 110 is of conventional type and has at the lower end thereof, adjacent to the intake manifold 148, a fuel discharging chamber 150 wherein a relatively high vacuum is always maintained regardless of whether or not the engine is running at high speeds or is idling. A hollow section 152 is inserted between the lower end of carburetor 110 and intake manifold 148, which is hollow as illustrated in Fig. 4, and which enlarges to a small extent the fuel discharging chamber 150. This section 152 provides a means for joining tube 154 to the aforesaid fuel discharging chamber 150 without altering any of the conventional parts of the engine assembly.

Tube 154 extends from section 152 to head 130 and has a valve 156 through the medium of which the opening through tube 154 may be altered to suit conditions. Head 130 has a way 158 provided therein at one side of valve member 124, which is in direct communication with passage 160 formed in valve member 124, when the parts of the breather system are properly set and when the carburetor is arranged to cause the engine to idle.

Valve member 124 is substantially cylindrical and rotates about the longitudinal axis upon which is disposed stub shafts 122 extending outwardly from each end of valve member 124. One stub shaft 122 has a spring 162 arranged to yieldably hold valve member 124 against adjustable stop screw 164, while the other stub shaft 122 is joined to arm 120 as above specified.

A relatively large notch 166 formed inwardly from the annular side of valve member 124 is in communication with passageway 160 and a pair of transverse passageways 168 extend through valve member 124 to cooperate with valve seats 170 and 172. These passageways 168 are in connection with notch 166 at their one end and terminate at the arcuate outer face of valve member 124 at the other ends thereof.

One of passageways 168 is relatively large in diameter and the distance between valve seats 170 on one side of valve member 124, is less than the distance between the ends of passageways 168 so that but one of the latter will be open at any one period of time.

As illustrated in Fig. 9, both passageways 168 are closed when passageway 160 is in communication with tube 154. When such condition prevails, valve member 124 completely segregates conduit 138 from air intake and air outlet ports 128 and 134 respectively.

The problem which has been persistent in this art, concerns the removal of evolved vapors during a time when evacuation of the crankcase is most needed. When an engine is idling the vacuumatic action created by the passage of air to the air intake of the carburetor, is relatively weak and therefore, the use of the aforementioned tube 154 will serve to establish the suction necessary when the parts of a breather system are assembled as just above set down. The connection between head 130 and fuel discharging chamber 150 is effective and the vacuumatic action created at the end of conduit 138, which is joined to head 130, is high enough to establish a suction that will withdraw the vapors from the crankcase while the engine is idling. The size of tube 154 may be altered through manipulation of valve 156 and the bore of tube 154 need be but a very small one.

As the fuel feeding structure of carburetor 110 is moved by throttle rod 114 from the position where the engine is idling, passageway 160 is withdrawn from a registered position with way 158 and immediately the larger, transverse passageway 168 emerges from behind seat 170 and forms an unrestricted connection between conduit 138 and air outlet 134. As the speed of the engine is increased and the likelihood of withdrawing oil or solids from the crankcase develops, relatively large passageway 168 is closed by the lower portion of valve seat 170 and the relatively small, transverse passageway 168 forms the connection between conduit 138 and air outlet port 134.

One skilled in the art will readily recognize the manner in which the breather system embodying the invention will operate, and while specific forms have been illustrated and described, it is desired to be limited only by the spirit of the invention and scope of the appended claims.

Having thus described the invention, what is claimed as new and desired to be secured by Letters Patent is:

1. The combination with an internal combustion engine having a carburetor provided with an air intake, and a crankcase chamber, of means for conveying vapors evolved within the crankcase to the air intake of the carburetor, said means comprising a chambered head provided with an air intake port, an air outlet port in connection with the air intake of the carburetor, and a vapor inlet opening; a conduit joining the crankcase chamber and said vapor inlet opening; a rotary valve member in the head for controlling the entrance of vapors into the latter through the vapor inlet opening thereof; and parts joining the throttle of the carburetor and the valve member to rotate the latter about its axis as the throttle is opened and closed, said rotary valve having a plurality of passageways formed therethrough, said passageways being graduated in diameter and extended transversely through the rotary valve at different angles whereby to be successively restricted as the valve is rotated about its axis toward one end of its path of travel completely closing the vapor inlet opening.

2. The combination with an internal combustion engine having a carburetor provided with an air intake, and a crankcase chamber, of means for conveying vapors evolved within the crankcase to the air intake of the carburetor, said means comprising a chambered head provided with an air intake port, an air outlet port in connection with the air intake of the carburetor, and a vapor inlet opening; a conduit joining the crankcase chamber and said vapor inlet opening; a rotary valve member in the head for controlling the entrance of vapors into the latter through the vapor inlet opening thereof; and parts joining the throttle of the carburetor and the valve member to rotate the latter about its axis as the throttle is opened and closed, said rotary valve having an arcuate seat formed by the head engaging diametrically opposite portions of the valve, said valve being provided with a plurality of passageways formed transversely therethrough and disposed to be successively closed by said arcuate seat as the valve is rotated about its axis toward one end of its path of travel closing the vapor inlet, said rotary valve having laterally projecting flexible ribs thereon for wiping the valve seat as the valve is rotated.

3. In a control head for engine breather systems of the character described, a valve operable to control the passage of vapors into the head from the crankcase of the engine comprising a cylindrical member; a pair of opposed, arcuate seats for the member; and laterally extending fibrous ribs on the periphery of the member to wipe the arcuate valve seats as the member is rotated about its axis.

4. In a control head for engine breather systems of the character described, a valve operable to control the passage of vapors into the head from the crankcase of the engines comprising a cylindrical member; a pair of opposed, arcuate seats for the member; and a plurality of transversely disposed passageways formed through the member at different angles whereby to be successively closed by the valve seats as the member is rotated.

5. In a control head for engine breather systems of the character described, a valve operable to control the passage of vapors into the head from the crankcase of the engine comprising a cylindrical member; a pair of opposed, arcuate seats for the member; a plurality of transversely disposed passageways formed through the member at different angles whereby to be successively closed by the valve seats as the member is rotated; and a laterally extending fibrous rib on the periphery of the member to wipe the face of the arcuate valve seats as the member is rotated.

6. The combination with an internal combustion engine having a crankcase and a carburetor, provided with an air intake port and a fuel discharging chamber, of means for withdrawing vapors evolved within the crankcase comprising a chambered head provided with a vapor inlet opening, an air intake port and an air outlet port in connection with the air intake port of the carburetor; a tube interconnecting the head and said fuel discharging chamber of the carburetor; and a valve member operably joined to the fuel feeding structure of the carburetor, said valve member having means to interconnect the conduit and the tube when the fuel fedeing structure of the carburetor is set to cause the engine to idle, said valve member serving to close the chamber of the head between the vapor inlet opening and the air intake and said air outlet thereof when the conduit and the tube are interconnected thereby.

7. The combination with an internal combustion engine having a crankcase and a carburetor, provided with an air intake port and a fuel discharging chamber, of means for withdrawing vapors evolved within the crankcase comprising a chambered head provided with a vapor inlet opening, an air intake port and an air outlet port in connection with the air intake port of the carburetor; a tube interconnecting the head and said fuel discharging chamber of the carburetor; and a valve member operably joined to the fuel feeding structure of the carburetor, said valve member having means to interconnect the conduit and the tube when the fuel feeding structure of the carburetor is set to cause the engine to idle, said valve member being provided with passageways therethrough disposed to be closed when the means of the valve for interconnecting the conduit and the tube is inoperative.

8. The combination with an internal combustion engine having a crankcase and a carburetor, provided with an air intake port and a fuel discharging chamber, of means for withdrawing vapors evolved within the crankcase comprising a chambered head provided with a vapor inlet opening, an air intake port and an air outlet port in connection with the air intake port of the carburetor; a tube interconnecting the head and said fuel discharging chamber of the carburetor; and a valve member operably joined to the fuel feeding structure of the carburetor, said valve member having means to interconnect the conduit and the tube when the fuel feeding structure of the carburetor is set to cause the engine to idle, said valve member serving to close the chamber of the head between the vapor inlet opening and the air intake and said air outlet thereof when the conduit and the tube are interconnected thereby, said tube having means therein for selectively increasing or decreasing the size of the opening therethrough.

9. The combination with an internal combustion engine having a crankcase and a carburetor, provided with an air intake port and a fuel discharging chamber, of means for withdrawing vapors evolved within the crankcase comprising a chambered head provided with a vapor inlet opening, an air intake port and an air outlet port in connection with the air intake port of the carburetor; a tube interconnecting the head and said fuel discharging chamber of the carburetor; and a valve member operably joined to the fuel feeding structure of the carburetor, said valve member having means to interconnect the conduit and the tube when the fuel feeding structure of the carburetor is set to cause the engine to idle, said valve member serving to close the chamber of the head between the vapor inlet opening and the air intake and said air outlet thereof when the conduit and the tube are interconnected thereby, said valve member being provided with elements for permitting the passage of vapors from the conduit to the air outlet of the head after the means for interconnecting the conduit and tube has become inoperative by the movement of the fuel feeding structure of the carburetor from the position causing the engine to idle.

10. A breather system for engines having a carburetor provided with an air intake port and a fuel discharging chamber, comprising a chambered head in connection with the air intake port of the carburetor; a conduit joining the head and the crankcase of the engine; a tube interconnecting the head and the fuel discharging chamber of the carburetor; a valve in the head; and means joining the fuel feeding structure of the carburetor and the valve for actuating the valve as fuel is fed to the carburetor, said valve having passageways formed therethrough disposed to successively interconnect the conduit and the tube and the conduit and said air intake port of the carburetor as the speed of the engine is increased from the idling position.

ADOLPH C. DRESSLER.